United States Patent
Shibata

(10) Patent No.: US 10,805,496 B2
(45) Date of Patent: Oct. 13, 2020

(54) SERVER APPARATUS THAT COMMUNICATES WITH A PLURALITY OF INFORMATION PROCESSING APPARATUSES AND TRANSMITS SYNCHRONIZATION DATA, INFORMATION PROCESSING METHOD, AND STORAGE MEDIUM

(71) Applicant: CANON KABUSHIKI KAISHA, Tokyo (JP)

(72) Inventor: Daisuke Shibata, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/398,049

(22) Filed: Apr. 29, 2019

(65) Prior Publication Data

US 2019/0349483 A1 Nov. 14, 2019

(30) Foreign Application Priority Data

May 10, 2018 (JP) .................................. 2018-091461

(51) Int. Cl.
*G06F 3/12* (2006.01)
*H04N 1/00* (2006.01)

(52) U.S. Cl.
CPC .......... *H04N 1/0097* (2013.01); *G06F 3/1205* (2013.01); *G06F 3/1232* (2013.01); *G06F 3/1288* (2013.01); *H04N 2201/0094* (2013.01)

(58) Field of Classification Search
CPC .......... H04N 1/0097; H04N 2201/0094; G06F 3/1232; G06F 3/1288; G06F 3/1205; G06F 3/122
See application file for complete search history.

(56) References Cited

U.S. PATENT DOCUMENTS

2017/0041488 A1* 2/2017 Shibata ............... H04N 1/00344
2019/0102408 A1* 4/2019 Loaiza .................. G06F 16/278

FOREIGN PATENT DOCUMENTS

JP 2015-121989 A 7/2015

* cited by examiner

*Primary Examiner* — Juan M Guillermety
(74) *Attorney, Agent, or Firm* — Canon U.S.A., Inc. IP Division

(57) ABSTRACT

A server apparatus that communicates with a plurality of information processing apparatuses and transmits synchronization data based on a database to an information processing apparatus that has requested data acquisition includes a hard disk drive (HDD) that stores the database, and at least one controller that updates the database based on update data transmitted from one information processing apparatus from among the plurality of information apparatuses, and receives a request for data acquisition and does not access the database when a transmission source of the request is the one information processing apparatus.

18 Claims, 6 Drawing Sheets

SERVER APPARATUS THAT COMMUNICATES WITH A PLURALITY OF INFORMATION PROCESSING APPARATUSES AND TRANSMITS SYNCHRONIZATION DATA, INFORMATION PROCESSING METHOD, AND STORAGE MEDIUM

BACKGROUND

Field

The present disclosure relates to a server apparatus, an information processing method, and a storage medium storing a program.

Description of the Related Art

In recent years, a technique for making a plurality of apparatuses cooperate with each other via a network has been employed in information processing apparatuses such as a multifunction peripheral. Japanese Patent Application Laid-Open No. 2015-121989 discusses a technique that enables a multifunction peripheral having a server function to perform synchronization and management of a setting value of another multifunction peripheral. According to the technique described in Japanese Patent Application Laid-Open No. 2015-121989, in which the synchronization and management of data are performed between the apparatuses, a data update request and a data acquisition request are transmitted from a multifunction peripheral operating as a client to a multifunction peripheral operating as a server. In this case, a storage device such as a hard disk drive (HDD) included in the multifunction peripheral operating as a server is accessed every time the data update request or the data acquisition request is transmitted. If the HDD is accessed at a high frequency, there is a risk of rapidly shortening the life of the HDD.

SUMMARY

Aspects of the present disclosure are directed to a server apparatus that suppresses the number of accesses made to a hard disk drive (HDD).

According to an aspect of the present disclosure, a server apparatus that communicates with a plurality of information processing apparatuses and transmits synchronization data based on a database to an information processing apparatus that requested data acquisition includes a hard disk drive (HDD) configured to store the database, and at least one controller configured to update the database based on update data transmitted from one information processing apparatus from among the plurality of information apparatuses, and receive a request for data acquisition and not to access the database when a transmission source of the request is the one information processing apparatus.

Further features will become apparent from the following description of exemplary embodiments with reference to the attached drawings.

DESCRIPTION OF THE EMBODIMENTS

Hereinafter, an exemplary embodiment will be described with reference to the appended drawings.

Figure 1:
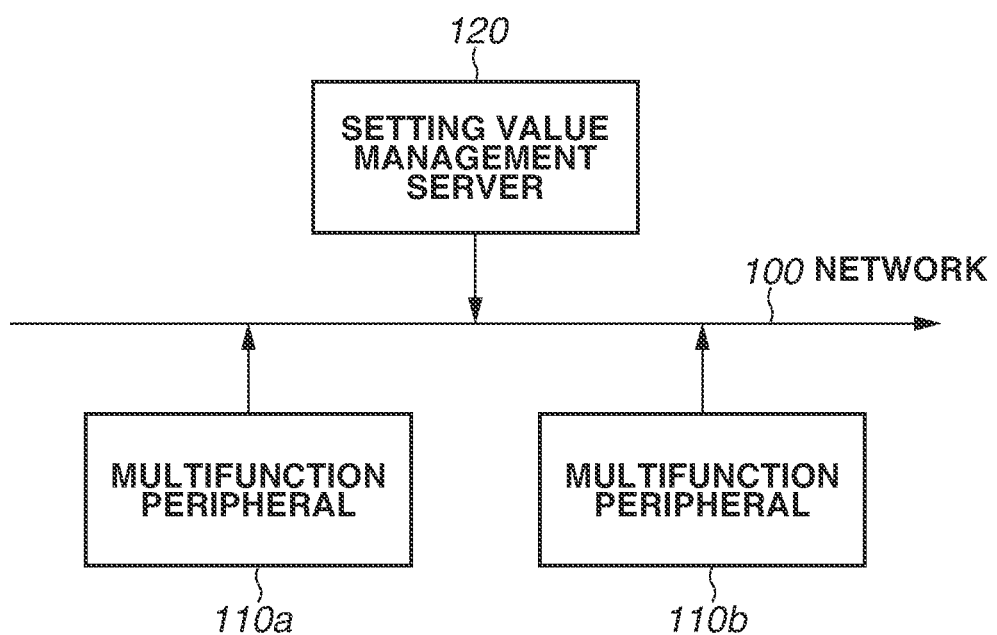
FIG. 1 is a block diagram illustrating an example of a system configuration of a setting value synchronization system.

FIG. 1 is a block diagram illustrating an example of a system configuration of a setting value synchronization system according to a first exemplary embodiment. Multifunction peripherals 110a and 110b and a setting value management server 120 are connected to a network 100. The setting value management server 120 manages setting values of the multifunction peripherals 110a and 110b, and has a function of reflecting the setting values retained thereby on the multifunction peripherals 110a and 110b. The multifunction peripherals 110a and 110b function as the clients of the setting value management server 120.

The function of the setting value management server 120 can be provided to the multifunction peripheral 110a or 110b. In this case, there is no setting value management server 120 as a hardware configuration.

The setting value management server 120 and the multifunction peripherals 110a and 110b will be described below in detail. The multifunction peripherals 110a and 110b will be collectively described as a multifunction peripheral 110, and thus the multifunction peripheral 110 can be either of the multifunction peripherals 110a and 110b. The multifunction peripheral 110 is one example of an image forming apparatus that forms an image.

The multifunction peripheral 110 is a device that implements a plurality of types of functions (e.g., copying and facsimile functions), and internally stores setting values used when the functions are executed. If a setting value is changed, the multifunction peripheral 110 notifies the setting value management server 120 of information about the change via the network 100. If the multifunction peripheral 110 receives information about a change of a setting value managed by the setting value management server 120, the multifunction peripheral 110 changes a setting value thereof. The setting values managed by the setting value management server 120 include a device setting value, which is used by each of the multifunction peripherals 110a and 110b to execute operation, and a user setting value, which is used by users. The user setting value includes a user-common setting value, which is a common setting value used by all users, and a user-specific setting value, which is a setting value different for each user.

If a setting value managed by the setting value management server 120 is changed, both of the multifunction peripherals 110a and 110b are notified of information about a change of the setting value. If a setting value of either of the multifunction peripherals 110a and 110b is changed, the setting value management server 120 is notified of information about the change, and then the other multifunction peripheral 110 is notified of the information about the change via the setting value management server 120.

Figure 2:
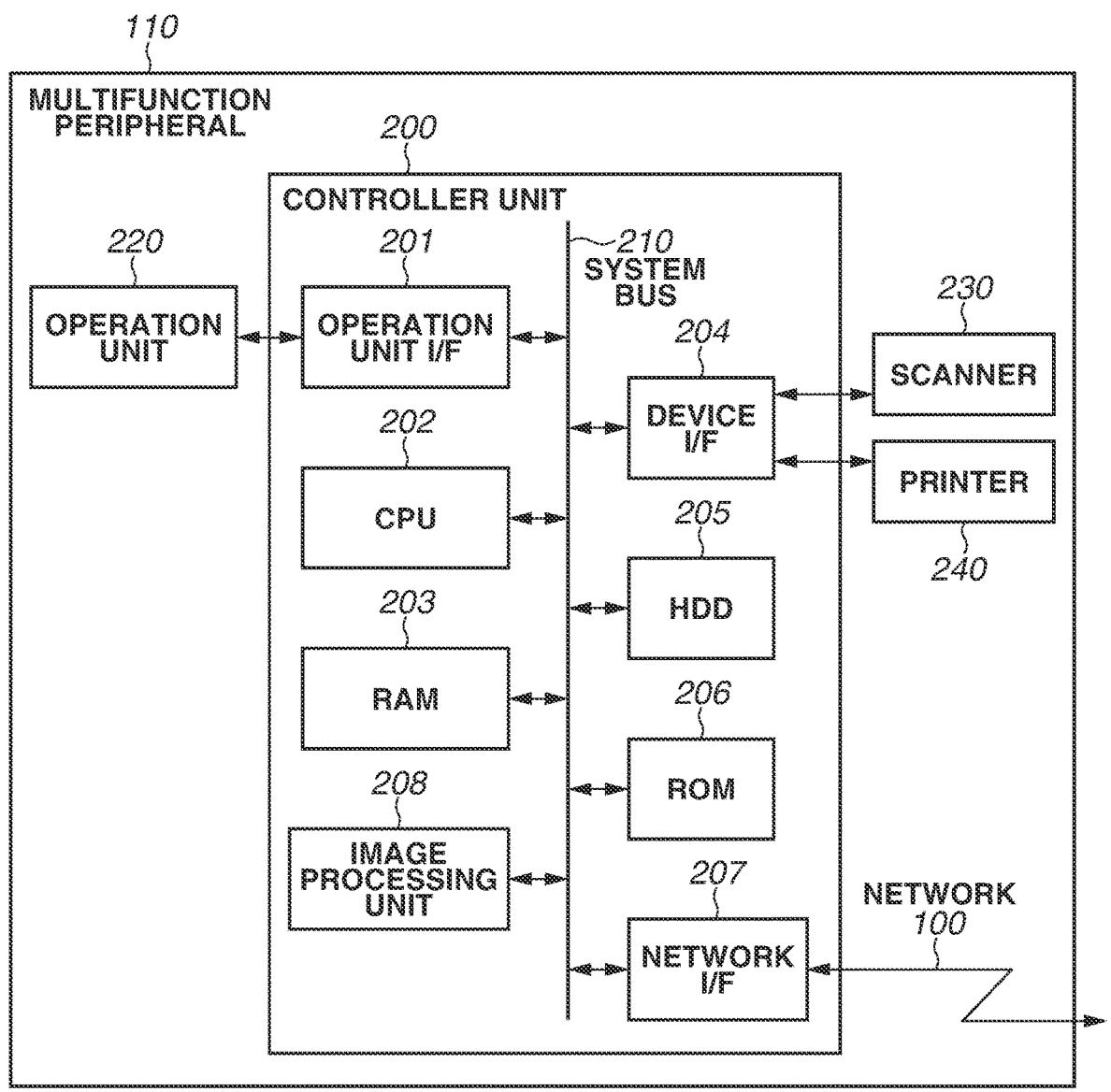
FIG. 2 is a block diagram illustrating an example of a hardware configuration of a multifunction peripheral.

FIG. 2 is a block diagram illustrating an example of a hardware configuration of the multifunction peripheral 110. The multifunction peripheral 110 includes a controller unit 200, an operation unit 220, a scanner 230, and a printer 240.

The controller unit 200 includes a central processing unit (CPU) 202. The CPU 202 boots an operating system (OS) using a boot program stored in a read only memory (ROM) 206. The controller unit 200 executes an application program stored in a hard disk drive (HDD) 205 and executes various kinds of processing through the application program. A random access memory (RAM) 203 is used as a work area of the CPU 202. The HDD 205 stores an application program and various kinds of data.

An operation unit interface (I/F) 201, a device I/F 204, a network I/F 207, and an image processing unit 208 are connected to the CPU 202 via a system bus 210, in addition to the RAM 203 and the ROM 206.

The operation unit I/F 201 is an interface to the operation unit 220 having a touch panel. Through the operation unit I/F 201, information such as data to be displayed on the operation unit 220 is transmitted or information input by a user is transmitted to the CPU 202. The scanner 230 and the printer 240 are connected to the controller unit 200 through the device I/F 204, and input and output of data and a control signal are executed there through. The network I/F 207 is connected to the network 100, and through the network IF 207, input and output of information is performed with a setting value management server 120 or a multifunction peripheral 110 connected to the network 100 via the network 100. The image processing unit 208 executes processing on an image input from the scanner 230, processing on an image to be output to the printer 240, and processing such as image rotation, image compression, resolution conversion, color space conversion, and gradation conversion.

Figure 3:
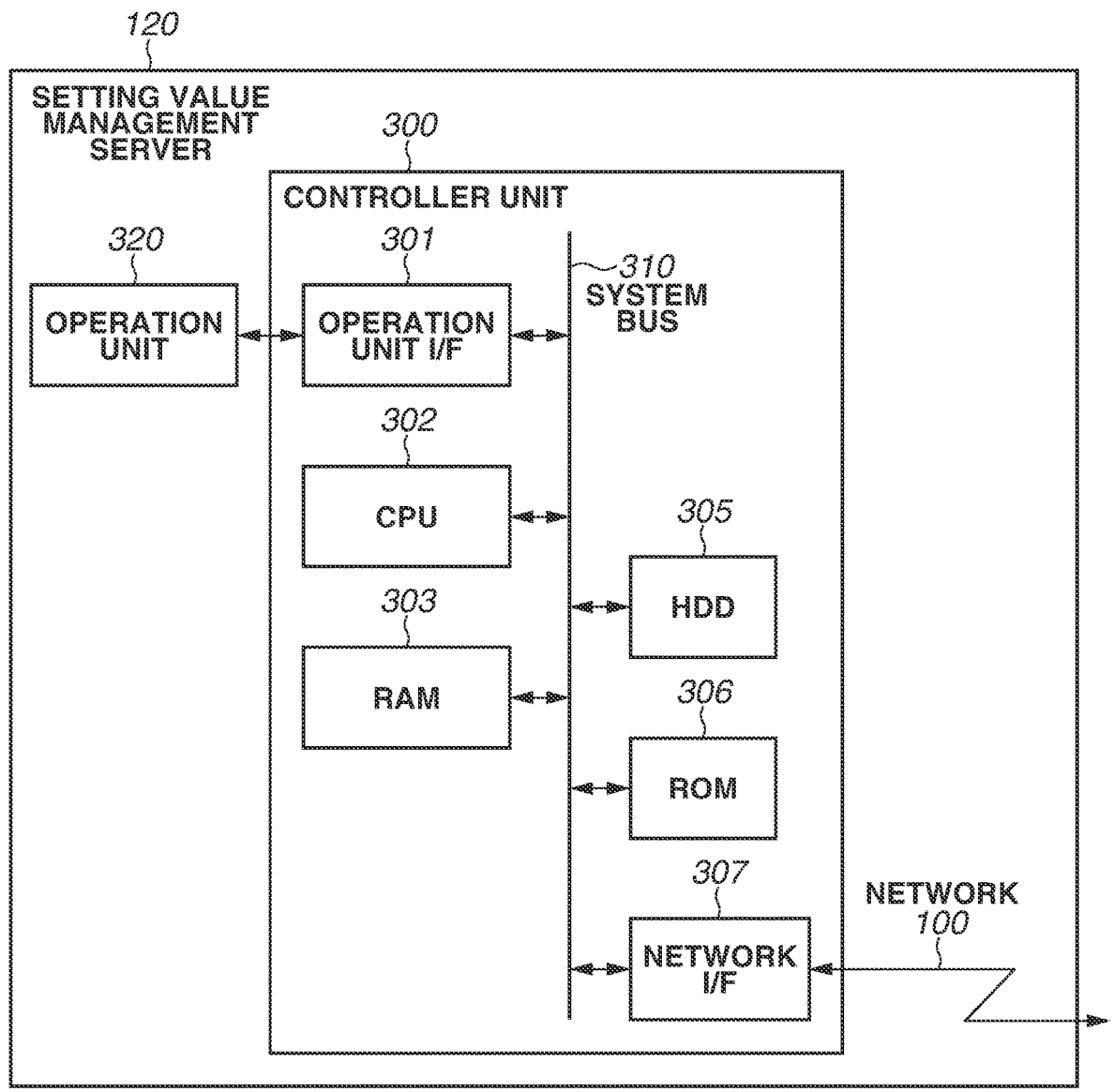
FIG. 3 is a block diagram illustrating an example of a hardware configuration of a setting value management server.

FIG. 3 is a block diagram illustrating an example of the hardware configuration of the setting value management server 120. The setting value management server 120 includes a controller unit 300 and an operation unit 320. The controller unit 300 includes a CPU 302, and the CPU 302 boots an OS using a boot program stored in a ROM 306. The CPU 302 executes an application program stored in a HDD 305 and executes various kinds processing through the application program. A RAM 303 is used as a work area of the CPU 302. The HDD 305 stores an application program, a device setting value of the multifunction peripheral 110, and a user setting value.

An operation unit I/F 301 and a network I/F 307 are connected to the CPU 302 via a system bus 310, in addition to the RAM 303 and the ROM 306.

The operation unit I/F 301 is an interface to the operation unit 320 including a mouse and a keyboard. Through the operation unit I/F 301, information input by the user using the operation unit 320 is transmitted to the CPU 302. The network I/F 307 is connected to the network 100, and through the network I/F 307, input and output of information is performed via the network 100 with another apparatus connected to the network 100. The network I/F 307 is one example of a receiving unit that receives a request from the multifunction peripheral 110.

The function of the setting value management server 120 can also exist in the multifunction peripheral 110 as a device server. In this case, the operation unit IF 201, the CPU 202, the RAM 203, the HDD 205, and the ROM 206 are used in place of the operation unit I/F 301, the CPU 302, the RAM 303, the HDD 305, and the ROM 306, respectively. Further, the network I/F 207 and the operation unit 220 are used in place of the network I/F 307 and the operation unit 320, respectively.

Figure 4:
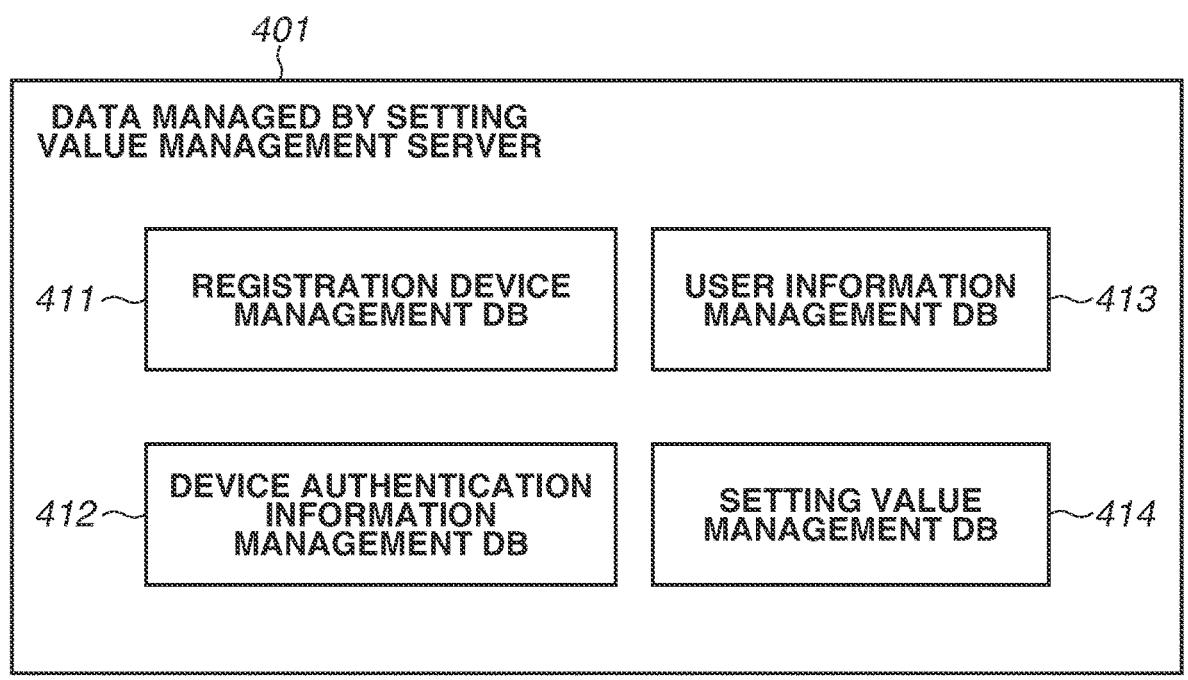
FIG. 4 is a block diagram illustrating an example of a data structure managed by the setting value management server.

FIG. 4 is a block diagram illustrating an example of a data structure managed by the setting value management server 120. Data 401 managed by a setting value management server includes a registration device management database (DB) 411, a device authentication information management DB 412, a user information management DB 413, and a setting value management DB 414, and is stored in the HDD 305 of the setting value management server 120.

The registration device management DB 411 retains registration information of the multifunction peripheral 110 that is synchronized with the setting value management server 120. As illustrated in a table 1, the registration device management DB 411 retains a device identifier that uniquely identifies the multifunction peripheral 110 and status data that describes a synchronization status of the multifunction peripheral 110.

TABLE 1

Registration Device Management DB

| Device Identifier | Status |
|---|---|
| device_100001 | Start |
| device_100002 | Stop |

The device authentication information management DB 412 manages authentication information of the multifunction peripheral 110. The information retained by the device authentication information management DB 412 will be described with reference to a table 2. The device authentication information management DB 412 retains a device identifier for uniquely identifying the multifunction peripheral 110, an authorization token for authorizing the multifunction peripheral 110 to perform synchronization processing with the setting value management server 120, and information about an issuance date and time of an authorization token issued by the setting value management server 120. The authorization token becomes invalid at the time when a predetermined period has passed from the issuance date and time. As one method for determining whether the authorization token is invalid, for example, at a timing at which a synchronization request is transmitted from the multifunction peripheral 110, the setting value management server 120 compares the current date and time with the issuance date and time. If a predetermined period of time has passed, the setting value management server 120 determines that the authorization token is invalid and deletes the corresponding authorization token from the device authentication information management DB 412. As another method, the setting value management server 120 can compare the current date and time with the issuance date and time periodically. If a predetermined period of time has passed, the setting value management server 120 can determine that the authorization token is invalid and can delete the corresponding authorization token from the device authentication information management DB 412. In both of the above-described methods, the setting value management server 120 deletes the authorization token and asks the multifunction peripheral 110 to perform registration again.

TABLE 2

| Device Authentication Information Management DB | | |
|---|---|---|
| Device Identifier | Authorization Token | Issuance Date and Time |
| device_100001 | ABCDE | 2016 Dec. 31 0:00 |
| device_100002 | FGHIJ | 2017 Jan. 1 0:00 |

The user information management DB 413 manages user information associated with a setting value that is synchronized with a setting value in the multifunction peripheral 110 by the setting value management server 120. As illustrated in a table 3, the user information management DB 413 retains information such as a user ID for uniquely identifying the user, and a user name indicating a display name of the user.

TABLE 3

| User Information Management DB | |
|---|---|
| User ID | User Name |
| user01 | Taro |
| user02 | John |

The setting value management DB 414 retains the setting value to be synchronized with a setting value in the multifunction peripheral 110 by the setting value management server 120. As illustrated in a table 4, the setting value management DB 414 includes a setting value identifier for identifying a setting value, and data indicating setting value information.

TABLE 4

| Setting Value Management DB | |
|---|---|
| Setting Value Identifier | Data |
| addressbook.fax_addressbook. 1 | XXX-000-1111 |
| addressbook.fax_addressbook. 2 | XXX-000-2222 |
| custom_menu.type | COPY |
| custom_menu.settingvalue | 1A2B3C4D5E6F |
| user01.language | JP |
| user02.language | EN |
| device_100001.settings.common.sleep_time | 10 min. |
| device_100002.settings.common.sleep_time | 30 min. |

Figure 5:
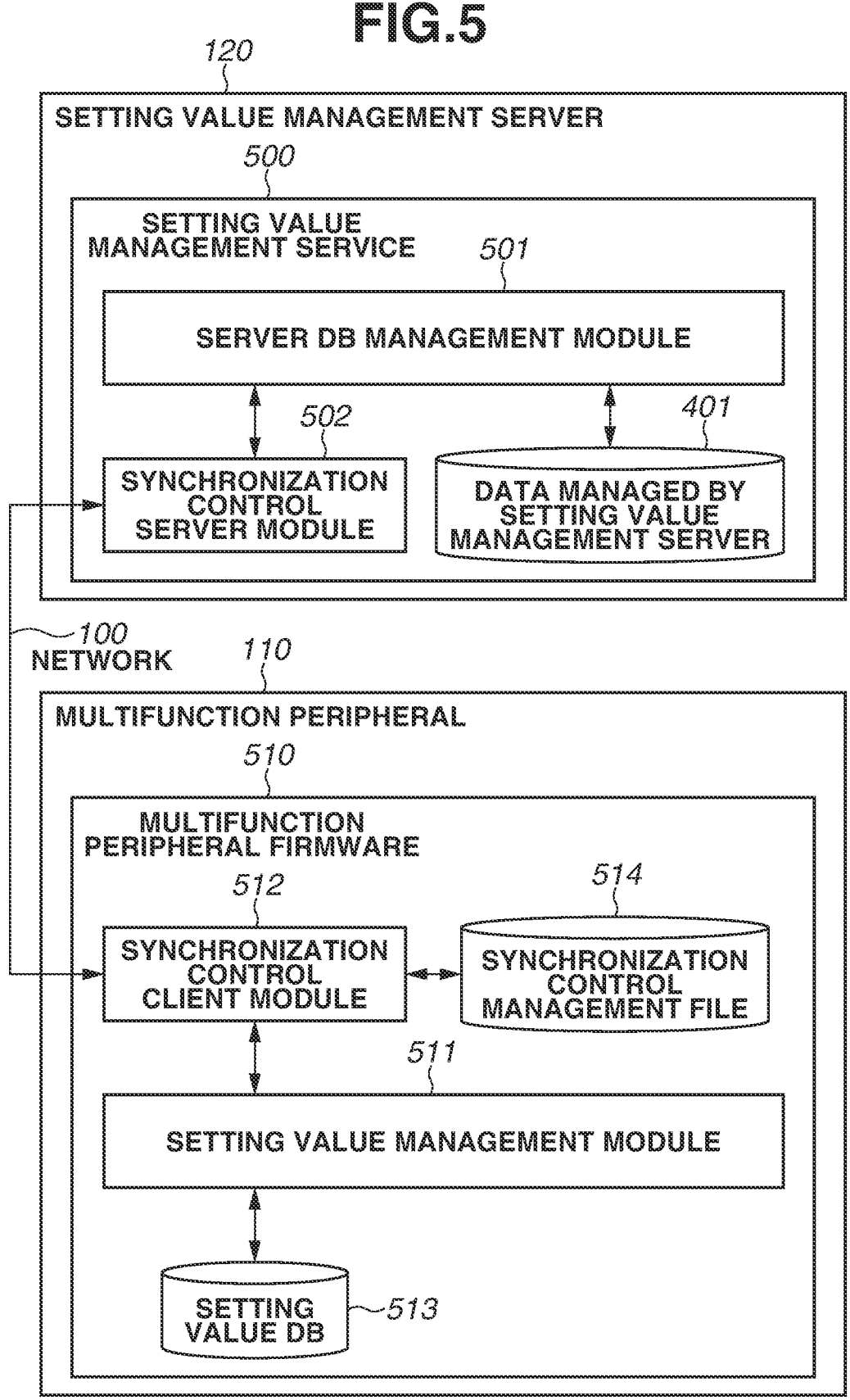
FIG. 5 is a block diagram illustrating an example of a software configuration of each of the multifunction peripheral and the setting value management server.

FIG. 5 is a block diagram illustrating an example of a software configuration of each of the multifunction peripheral 110 and the setting value management server 120.

Each of functional units included in the multifunction peripheral 110 is implemented by the CPU 202 reading and executing a program in multifunction peripheral firmware 510 stored in the HDD 205. Each of functional units included in the setting value management server 120 is implemented by the CPU 302 calling and executing a program in a setting value management service 500 stored in the HDD 305.

The setting value management service 500 includes a server DB management module 501 for editing the data 401 managed by the setting value management server, and all data is edited through the server DB management module 501. A synchronization control server module 502 receives a data acquisition request or a change request from the multifunction peripheral 110 via the network 100, and instructs the server DB management module 501 to execute reading and writing. The multifunction peripheral firmware 510 includes a setting value DB 513, and reading and writing is executed through the setting value management module 511. All application programs (not illustrated in FIG. 5) operating on the multifunction peripheral 110 access the data in the setting value DB 513 by using the setting value management module 511. The setting value DB 513 is stored in the HDD 205, and consists of components such as an identifier and a value of the setting value.

The synchronization control client module 512 transmits a data synchronization request to the synchronization control server module 502 in the setting value management service 500 via the network 100. Then, the synchronization control client module 512 performs an operation for making a change in the DB of the setting value management server 120 into the multifunction peripheral 110 or an operation for reflecting an update of the setting value DB 513 of the multifunction peripheral 110 on the DB of the setting value management server 120. The synchronization control client module 512 writes information necessary for the data synchronization request into the synchronization control management file 514 and reads the information therefrom. The synchronization control management file 514 is stored in the HDD 205, and information such as a last update time of the setting value, an authentication method, an authorization token, and a log of synchronization control are stored therein.

The synchronization control client module 512 requests synchronization at a specific timing or at a timing of executing regular polling. The synchronization control client module 512 requests synchronization at the specific timing, for example, to acquire the user-specific setting value of the log-in user at the timing when the user performs log-in processing on the operation unit 220. The synchronization control client module 512 requests synchronization at the timing of executing the regular polling, for example, to detect a change of the user-common setting value that has no specific timing to make a synchronization request unlike in the log-in processing performed by the user. Such request is used at a polling interval different for each of the setting value identifiers of the setting value management DB 414.

The data synchronization request includes an acquisition request and a registration/update request. The acquisition request includes an all data acquisition request for requesting all data in the setting value management service 500 and a difference data acquisition request for requesting only data that has been updated since a specific time. The registration/update request includes a data registration request for newly registering data, and a data update request for updating specific data. For example, the all data acquisition request is transmitted in a state where the setting value management service 500 and the multifunction peripheral firmware 510 do not perform data synchronization in order to acquire all the setting values in the setting value management server management data 401 and reflect the setting values on the setting value DB 513. The difference data acquisition request is transmitted in a state where the setting value management service 500 and the multifunction peripheral firmware 510 have already started synchronization in order to acquire only an updated setting value to start synchronization. The series of processing from reflecting the change of the setting value DB 513 on the setting value management server management data 401 to detecting the change of the setting value management server management data 401 and reflecting the detected change in the setting value DB 513 is referred to as a synchronization control. The data registration request is an example of the registration request. The data update request is an example of the update request.

The data synchronization request includes information for identifying the multifunction peripheral 110 and information for performing synchronization. For example, a device identifier for uniquely identifying the multifunction peripheral 110 and an authorization token used for checking that the multifunction peripheral 110 is authorized are included in the information for identifying the multifunction peripheral 110. Information such as a setting value identifier for specifying a setting value to be acquired, registered, or updated, data of the setting value to be registered or updated, and an update time indicating a time when the setting value is updated in the multifunction peripheral 110 are included in the information for performing synchronization.

In the above-described operation configuration in which a device server is employed, both of the setting value management service 500 and the multifunction peripheral firmware 510 operate in the multifunction peripheral 110.

Figure 6:
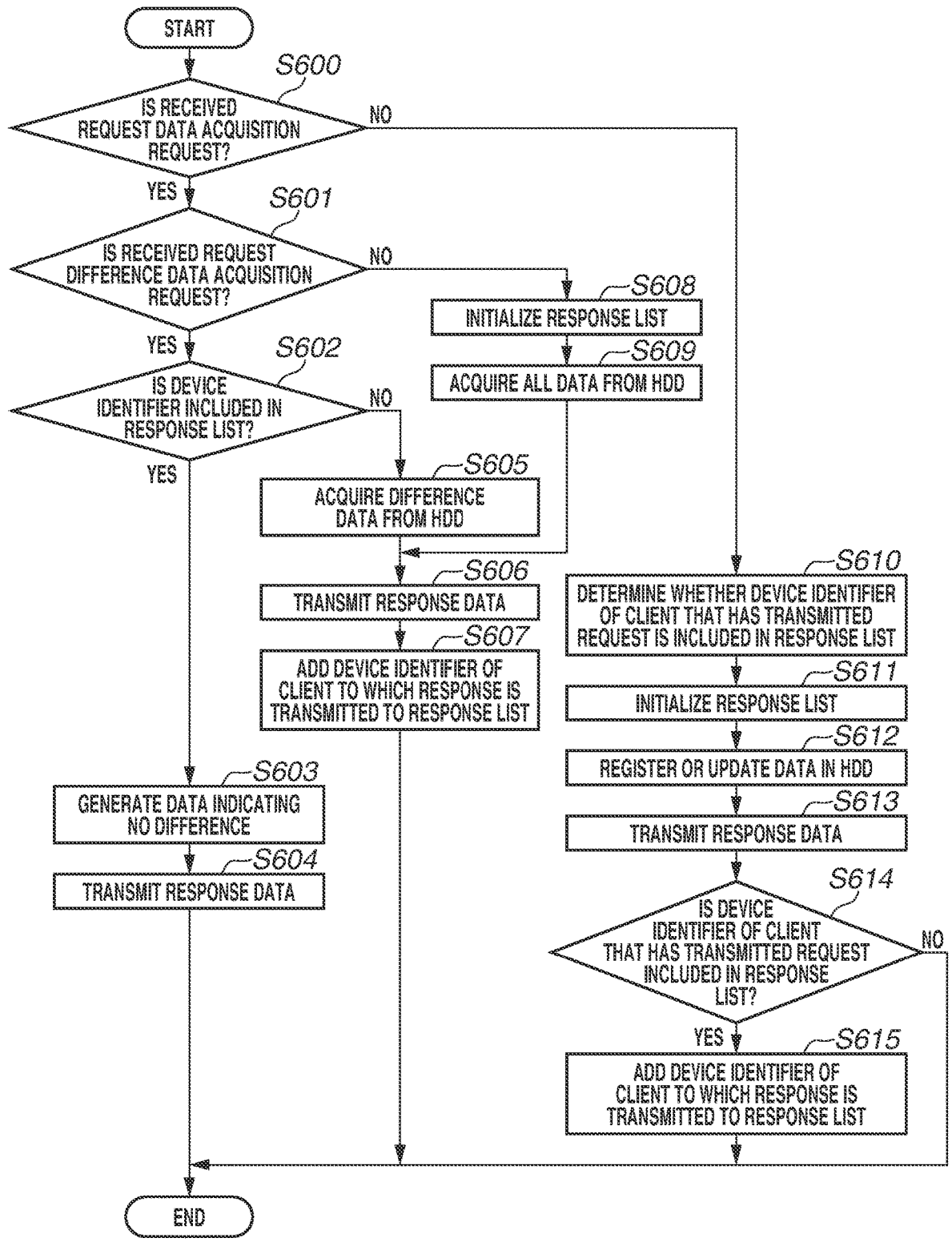
FIG. 6 is a flowchart illustrating an example of information processing performed by the setting value management server.

FIG. 6 is a flowchart illustrating an example of information processing performed by the setting value management server 120 receiving a data synchronization request from the multifunction peripheral 110 via the network 100. The CPU 302 of the setting value management server 120 loads a program of the setting value management service 500, which is stored in the HDD 305, into the RAM 303 and executes the program to implement each step of the flowchart.

In step S600, the setting value management service 500 determines whether a received request is a data acquisition request. If the received request is the data acquisition request (YES in step S600), the processing proceeds to step S601. If the received request is not a data acquisition request (NO in step S600), the processing proceeds to step S610.

In step S601, the setting value management service 500 determines whether the received request is a difference data acquisition request. If the received request is a difference data acquisition request (YES in step S601), the processing proceeds to step S602. If the received request is not a difference data acquisition request (NO in step S601), the processing proceeds to step S608.

In step S602, the setting value management service 500 determines whether a device identifier of the multifunction peripheral 110 that has transmitted the request is included in a response list illustrated in a table 5. The response list is stored in the RAM 103 and is a table that stores a device identifier of the multifunction peripheral 110 to which a response to a difference data acquisition request has been transmitted once. As a result of the determination, if the device identifier is included in the response list (YES in step S602), the processing proceeds to step S603. If the device identifier is not included in the response list (NO in step S602), the processing proceeds to step S605.

TABLE 5

| Device Identifier |
| --- |
| device_100001 |
| device_100002 |

The response list is an example of a list of devices that have responded. The device identifier is an example of identification information for identifying a client device.

In step S603, the setting value management service 500 generates empty response data indicating there is no difference, and the processing proceeds to step S604.

In step S604, the setting value management service 500 transmits the response data generated in step S603 to the multifunction peripheral 110 and ends the processing of the flowchart in FIG. 6. In this processing, access to the setting value management server management data 401 from the server DB management module 501 does not occur, and access to the HDD 305 does not occur either.

In step S605, the setting value management service 500 acquires difference data from the setting value DB 513 stored in the HDD 305. Then, the processing proceeds to step S606.

In step S606, the setting value management service 500 transmits the difference data acquired in step S605 (response data) to the multifunction peripheral 110. Then, the processing proceeds to step S607.

In step S607, the setting value management service 500 adds the device identifier of the multifunction peripheral 110 to which the response has been transmitted to the response list, and ends the processing of the flowchart in FIG. 6.

In step S608, the setting value management service 500 executes initialization by deleting all device identifiers from the response list, and the processing proceeds to step S609.

In step S609, the setting value management service 500 acquires all data that match the setting value identifier specified by the multifunction peripheral 110 from the setting value management DB 414 of the setting value management server management data 401 through the server DB management module 501. Then, the setting value management service 500 advances the processing to step S606.

In step S610, the setting value management service 500 determines whether a device identifier of the multifunction peripheral 110 that has transmitted the data synchronization request is included in the response list, and saves a determination result in the RAM 303. Then, the processing proceeds to step S611.

In step S611, the setting value management service 500 executes initialization by deleting all device identifiers from the response list. Then, the processing proceeds to step S612.

In step S612, if the received request is a data registration request, the setting value management service 500 registers a setting value identifier and a value specified by the multifunction peripheral 110 in the setting value management DB 414. If the received request is a data update request, the setting value management service 500 updates data that is stored in the setting value management DB 414 and that matches the setting value identifier specified by the multifunction peripheral 110 to a value specified by the multifunction peripheral 110. Then, the processing proceeds to step S613.

In step S613, the setting value management service 500 transmits a processing result of registration or update executed in step S612 (response data) to the multifunction peripheral 110. Then, the processing proceeds to step S614.

In step S614, the setting value management service 500 reads out the determination result stored in step S610 from the RAM 303, and determines whether the device identifier of the multifunction peripheral 110 that has transmitted the request is included in the response list. If the device identifier is included in the response list (YES in step S614), the processing proceeds to step S615. If the device identifier is not included in the response list (NO in step S614), the processing of the flowchart in FIG. 6 is ended.

In step S615, the setting value management service 500 adds, to the response list, the device identifier of the multifunction peripheral 110 to which a response has been transmitted in step S613, and ends the processing of the flowchart in FIG. 6.

In the present exemplary embodiment, in a case where the device identifier of one multifunction peripheral 110 as a request source is described in the response list when a data update request is processed, the setting value management service 500 describes the device identifier of the one request-source multifunction peripheral 110 in the response list after initializing the response list. As a result of this processing, if a difference data acquisition request transmitted from the same multifunction peripheral 110 is to be processed after the data update request has been processed, the setting value management service 500 can determine presence or absence of a difference based on information described in the response list and can transmit a response. As a result, while the data update request from the multifunction peripheral 110 has been processed but no data update request from another multifunction peripheral 110 is processed, the response can be transmitted without accessing the HDD 305 when the difference data acquisition request from the same multifunction peripheral 110 is to be processed. Accordingly, in comparison to the case where the processing in step S615 is not performed, a number of times of access to the HDD 305 can be reduced.

Data synchronization according to the present exemplary embodiment can be performed for each data type retained in the setting value management server management data 401, and a response list can be retained for each synchronization data type. In a case where synchronization is performed for each data type and a response list is retained for each data type, the setting value management service 500 performs initialization or addition of a device identifier on a response list associated with the data type included in the request when a data synchronization request is to be processed. With this configuration, if a difference data acquisition request for the same data type transmitted from the same multifunction peripheral 110 is to be processed after a data update request has been processed, the setting value management service 500 can determine presence or absence of a difference based on the response list associated with the data type of the request and can transmit a response. As a result, if a data update request for updating the same data type transmitted from another multifunction peripheral 110 is not processed when a difference data acquisition request is to be processed, the response can be transmitted without accessing the HDD 305.

Data synchronization according to the present exemplary embodiment can also be executed on data for each user ID retained in the setting value management server management data 401, and a response list can be retained for each user ID of data to be synchronized. In a case where data synchronization is performed for each user ID and a response list is retained for each user ID, the setting value management service 500 performs initialization or addition of a device identifier on a response list associated with the user ID included in the request when a data synchronization request is to be processed. With this configuration, if a difference data acquisition request for the same user ID transmitted from the same multifunction peripheral 110 is to be processed after a data update request has been processed, the setting value management service 500 can determine presence or absence of a difference based on a response list associated with the user ID of the request and can transmit a response. Accordingly, in a case where the same user continuously uses the same multifunction peripheral 110, the HDD 305 is accessed for data synchronization only when a data update request is to be processed. The user ID is an example of the user identification information.

Data synchronization according to the present exemplary embodiment can also be executed by using a combination of a data type and a user ID. In this case, the synchronization can be performed for each data corresponding to the combination, and the response list can be retained for each data corresponding to the combination. At this time, the data synchronization can be performed for each combination of the data type and the user ID, and presence or absence of a difference can be determined based on information described in the response list associated with the combination and can be transmitted when a difference data acquisition request is to be processed. With this configuration, if a data update request for the same combination transmitted from another multifunction peripheral 110 is not processed when the difference data acquisition request is to be processed, a response can be transmitted without accessing the HDD 305. As a result, access to the HDD 305 can be reduced for each combination of a data type and a user ID.

One or more functions of the above-described exemplary embodiments can be implemented by supplying a program to a system or an apparatus via a network or a storage medium. The one or more functions can be implemented through processing in which one or more processors in a computer of the system or the apparatus read and execute the program. The one or more functions can be also implemented by a circuit (e.g., application specific integrated circuit (ASIC)) that implements.

While one exemplary embodiment has been described in detail, it is not seen to be limiting.

In the above-described exemplary embodiment, the HDD is described as an example of the storage device. However, this is not seen to be limiting. For example, the present disclosure is also applicable to a storage device such as a solid state drive (SSD) in which a failure occurrence rate is increased as reading and writing are executed for a plurality of times.

The above-described multifunction peripheral 110 and the setting value management server 120 each perform processing by using a single CPU based on a program stored in a ROM or a HDD. However, both the multifunction peripheral 110 and the setting value management server 120 can also perform the processing by using a plurality of CPUs (or processors) in cooperation with a plurality of RAMs or HDDs based on a program. Further, all or part of a software configuration of each of the multifunction peripheral 110 and the setting value management server 120 can be implemented as a hardware configuration.

As described above, according to the above-described exemplary embodiment, access to the storage device can be reduced without suppressing a memory capacity of a cache memory before a failure occurrence rate of the storage device is increased.

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-091461, filed May 10, 2018, which is hereby incorporated by reference herein in its entirety.

What is claimed is:

1. A server apparatus that communicates with a plurality of information processing apparatuses and transmits synchronization data based on a database to an information processing apparatus that requested data acquisition, the server apparatus comprising:
a hard disk drive (HDD) configured to store the database;
a memory configured to store information; and
at least one controller configured to:
update the database based on update data transmitted from one information processing apparatus from among the plurality of processing information apparatuses, and and store device management information corresponding to the updated database in the memory, wherein the one information processing apparatus is managed as a synchronized device in the device management information;
receive a request for data acquisition; and
access the updated database and transmits synchronization data based on the updated database in a case where the device management information indicates that an information processing apparatus that requests data acquisition is not a synchronized device, and does not access the updated database in a case where the device management information indicates that the information processing apparatus that requests data acquisition is a synchronized device.

2. The server apparatus according to claim 1, wherein the device management information includes identification information of an information processing apparatus that has synchronized with the server after an update of the database is added.

3. The server apparatus according to claim 2, wherein the device management information is reset in response to an update of the database.

4. The server apparatus according to claim 1, wherein the request for data acquisition is a request for acquiring all data in the updated database as synchronization data.

5. The server apparatus according to claim 1, wherein the request for data acquisition is a request for acquiring part of data in the updated database as synchronization data.

6. The server apparatus according to claim 1, further comprising an image forming device configured to form an image on a sheet.

7. A control method of a server apparatus including a hard disk drive (HDD) that stores a database and communicates with a plurality of information processing apparatuses and to transmit synchronization data based on the database to an information processing apparatus that requested data acquisition, the control method comprising:
updating the database based on update data transmitted from one information processing apparatus from among the plurality of information processing apparatuses, and store device management information corresponding to the updated database in the memory, wherein the one information processing apparatus is managed as a synchronized device in the device management information;
receiving a request for data acquisition; and
accessing the database and transmitting synchronization data based on the updated database in a case where the device management information indicates that an information processing apparatus that requests data acquisition is not a synchronized device, and does not access the updated database in a case where the device management information indicates that the information processing apparatus that requests data acquisition is a synchronized device.

8. The control method according to claim 7, wherein the device management information is reset in response to an update of the database.

9. The control method according to claim 7, wherein the request for data acquisition is a request for acquiring all data in the updated database as synchronization data.

10. The control method according to claim 7, wherein the request for data acquisition is a request for acquiring part of data in the updated database as synchronization data.

11. The control method according to claim 7, wherein the device management information includes identification information of an information processing apparatus that has synchronized with the server after an update of the database is added.

12. The control according to claim 7, further comprising an image forming device configured to form an image on a sheet.

13. A non-transitory computer-readable storage medium that stores a program for causing a computer to execute a control method of a server apparatus including a hard disk drive (HDD) that stores a database and communicates with a plurality of information processing apparatuses and to transmit synchronization data based on the database to an information processing apparatus that requested data acquisition, the control method comprising:
updating the database based on update data transmitted from one information processing apparatus from among the plurality of information processing apparatuses, and store device management information corresponding to the updated database in the memory, wherein the one information processing apparatus is managed as a synchronized device in the device management information;
receiving a request for data acquisition; and
accessing the database and transmitting synchronization data based on the updated database in a case where the device management information indicates that an information processing apparatus that requests data acquisition is not a synchronized device, and does not access the updated database in a case where the device management information indicates that the information processing apparatus that requests data acquisition is a synchronized device.

14. The non-transitory computer-readable storage medium according to claim 13, wherein the device management information is reset in response to an update of the database.

15. The non-transitory computer-readable storage medium according to claim 13, wherein the request for data acquisition is a request for acquiring all data in the updated database as synchronization data.

16. The non-transitory computer-readable storage medium according to claim 13, wherein the request for data acquisition is a request for acquiring part of data in the updated database as synchronization data.

17. The non-transitory computer-readable storage medium according to claim 13, wherein the device management information includes identification information of an information processing apparatus that has synchronized with the server after an update of the database is added.

18. The non-transitory computer-readable storage medium according to claim 13, further comprising an image forming device configured to form an image on a sheet.

* * * * *